United States Patent [19]

Adderley, Jr.

[11] Patent Number: 4,465,451

[45] Date of Patent: Aug. 14, 1984

[54] APPARATUS AND METHOD FOR CONTROLLING EXTRUSION BACK PRESSURE

[75] Inventor: Thomas E. Adderley, Jr., Norristown, Pa.

[73] Assignee: Welding Engineers, Inc., King of Prussia, Pa.

[21] Appl. No.: 400,924

[22] Filed: Jul. 21, 1982

[51] Int. Cl.³ .............................................. B29F 3/06
[52] U.S. Cl. .................................. 425/145; 264/40.5; 264/142; 425/146; 425/150; 425/183; 425/190; 425/192 R; 425/198; 425/309; 425/310; 425/313; 425/376 A
[58] Field of Search ................. 425/149, 183, DIG. 4, 425/150, 168, 192 R, 192 S, 198, 199, 376 A, 376 B, 146, 190, 145, 309, 313, 310; 264/141, 142, 40.5

[56] References Cited

U.S. PATENT DOCUMENTS

| | | | |
|---|---|---|---|
| 3,345,854 | 10/1967 | Gross | 425/183 |
| 3,455,357 | 7/1969 | Zink | 425/183 |
| 3,874,835 | 4/1975 | Rossiter et al. | 425/313 |
| 3,912,439 | 10/1975 | Newman | 425/464 |
| 3,973,890 | 8/1976 | Porter et al. | 425/144 |
| 4,395,212 | 7/1983 | Lambertus | 425/199 |

*Primary Examiner*—Jeffery R. Thurlow
*Attorney, Agent, or Firm*—Austin R. Miller

[57] ABSTRACT

An apparatus for controlling extrusion back-pressure in a face cutting apparatus having an extrudate feed means, a die and a cutter is provided. The apparatus consists of a pair of nested dies, one upstream and one downstream, each die having a plurality of areas, each of the areas having a plurality of extrusion orifices. The nested dies are movable relative to another. In one relative position, the orifices of the upstream die exactly aligned with the orifices of the downstream die. Means are provided for relative movement of the dies in response to a change in the pressure adjacent the extrudate delivery end.

10 Claims, 3 Drawing Figures

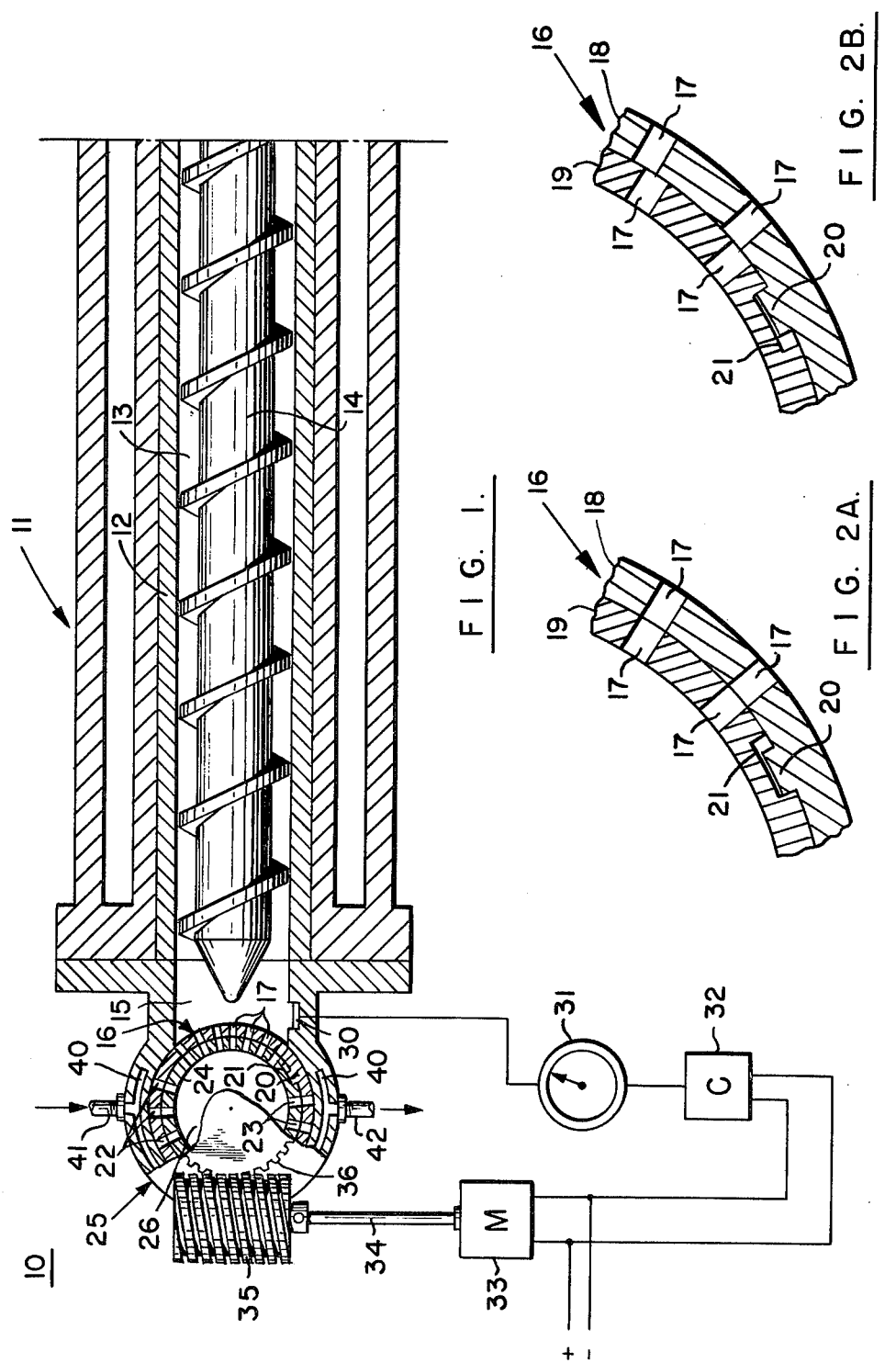

APPARATUS AND METHOD FOR CONTROLLING EXTRUSION BACK PRESSURE

BACKGROUND OF THE INVENTION

1. Field of the Invention

This invention relates to adjustable die face pelletizers and specifically to a face-cutting apparatus for making pellets of thermoplastic material while controlling extrusion back pressure in the thermoplastic extruder.

2. Description of the Prior Art

A face-cutting apparatus of the type described is disclosed in U.S. Pat. No. 3,973,890. In such an apparatus, the die plate means associated with the thermoplastic extruder is hollow and cylindrically shaped and is provided with radially extending extrusion orifices through which heat-plastified material or extrudate is extruded by reason of the operation of a rotating feed screw which pressurizes the material upstream of the die plate means. The die plate means comprises a pair of nested die plates mounted for slight selective positioning for altering or adjusting the degree of alignment or misalignment of the orifices in the nested die plates relative to one another.

The cutter in such a face-cutting apparatus has a plurality of blades projecting radially from a cylindrical body and extending longitudinally therealong. At the free end of each blade is a cutting edge that is operatively associated with the downstream side of the die plate means, so that upon rotation of the cutter, heat-plastified material extruded through the orifices of the die plate means is sheared into pellets. Adjacent pairs of blades on the cutter and the intervening body portion establish continuous longitudinally extending channels into which the newly sheared pellets collect. A pellet treatment fluid is flushed through the channels formed by the cutter and the die plate means in order to sweep the pellets from the cutting edge of the blade as they are severed. The pellets are then collected at the downstream end of the cutter.

In the prior art devices the die plate means are rotatable with respect to one another. In one relative position, the orifices in the plates are completely aligned to offer minimum resistance to the extrusion of heat-plastified material through the orifices. By changing the relative position of the two die plates, the resultant misalignment of the orifices introduces an obstruction at the interface between the plates to the extrusion of material. Selective changes in the relative rotational position of the nested die plates, in response to changes in the pressure of the heat-plastified material upstream of the die plates, maintains a substantially constant rate of extrusion. Furthermore, because the flow obstruction occurs at the interface between the die plates, the cross-section of the material at the downstream face of the die plate closest to the cutter will be constant. Since the rate of extrusion is kept constant, the thickness of the pellets is uniform.

These prior art devices for maintaining extrusion flow rate by adjusting extrusion back pressure presented several disadvantages.

First, the die plate means have a relatively short operating life. Thus, it is necessary to frequently shut down the thermoplastic extruders in order to replace worn die plates. Such a replacement operation becomes both time consuming and costly over the operating life of an extruder.

Secondly, it is desirable for an extruder to have the ability to produce thermoplastic pellets of varying diameters for different applications. In the prior art devices, the die plate means only had one set of extrusion orifices all having the same diameter. Hence, the prior art devices had no capability of producing more than one size of thermoplastic pellet. Instead, it was necessary to stop the machine, clean it and then replace the die plates with another set of die plates having different size orifices. As was mentioned above, this process is both time consuming and costly.

Thus, there has been a need in the art for a die plate means to be used in conjunction with a face-cutting apparatus having a substantially longer life than the prior art devices.

Furthermore, there has been a need in the art for such a long-life device which has the ability to produce different sizes of thermoplastic pellets without costly shutdown and cleaning procedures.

Still further, there has been a need in the art for a die plate means able to quickly and easily convert from the production of one size (diameter) pellet to another size pellet without readjusting the relative rotational positions of the nested die plates.

These and other objects are provided by the apparatuses and methods of the present invention.

SUMMARY OF THE INVENTION

The apparatus of the present invention comprises a face-cutting apparatus having an extrudate feed means with an extrudate delivery end, a die plate means and a cutter means as well as an apparatus for controlling extrusion back pressure comprising an upstream (outer sleeve) die with a plurality of areas, each area having a plurality of extrusion orifices, wherein only one of said areas is able to align with the delivery end of the extruder bore at any one time, a downstream (inner sleeve) die adjacent the upstream die having a plurality of areas each having a plurality of extrusion orifices corresponding to, and being able to exactly align with the areas and orifices of the upstream die, a pressure sensing means for sensing the pressure in the extruder bore, means for moving one of said dies relative to the other die in response to a change in the pressure in the extruder bore and means for simultaneously moving both dies relative to the extrudate feed means in order to align a different area with the delivery end of the extruder bore without changing the relative positioning of the dies, which remain in the matched position.

BRIEF DESCRIPTION OF THE DRAWINGS

FIG. 1 is a side view, partly in section, of one embodiment of the face cutting apparatus of the present invention;

FIG. 2A is an enlarged sectional view of a preferred embodiment of the die plate means of the present invention showing the die sleeves in a matched position; and FIG. 2B is an enlarged sectional view of the die plate means shown in FIG. 2A in a different relative orientation, showing the die sleeves in a mismatched position.

Although specific forms of apparatus embodying the invention have been selected for illustration in the drawings, and although specific terminology will be resorted to in describing those forms in the specification which follows, their use is not intended to define or to limit the scope of the invention, which is defined in the appended claims.

DESCRIPTION OF THE PREFERRED EMBODIMENTS

Referring to FIG. 1, the face-cutting apparatus is designated generally by reference numeral 10 and is associated with extrusion device 11. Extrusion device 11 comprises an extrusion chamber 12 having a kneading or mixing bore 13. Mounted within bore 13 is a rotatable feed screw 14 driven by a power source (not shown). Downstream of chamber 12 is chamber 15 which is adjacent the delivery end of the extruder bore 13. Heat plastified material is delivered into chamber 15 by the rotation of screw 14. Fastened to the end of extrusion device 11 is housing 25 containing a cylindrically shaped die plate means 16 having a plurality of radially extended extrusion orifices 17 through which heat plastified material is extruded due to the pressure built up in chamber 15 by the rotation of screw 14.

A rotary cutter (not shown) is normally positioned within the interior 26 of the die plate means 16. Such a cutter is well-known in the art and generally has a cylindrical body mounted for rotation about its longitudinal axis which is aligned with the axis of die plate means 16. The cutter typically has a plurality of blades projecting radially from and extending longitudinally along the cylindrical body in helical fashion. Each of the blades has a cutting edge which is operatively associated with the downstream face 24 of die plate means 16. Thus, there is very little clearance between the cutting edge of the rotary cutter and face 24. As a consequence, heat plastified material extruded through orifice means 17 in die plate means 16 is sheared by the cutter as it rotates. The resultant pellets formed by the cutter operation have a diameter (assuming the orifices are circular in cross-section) determined by the downstream size of orifices 17, and a length determined by the speed of rotation of the cutter and the pressure of the heat plastified material in chamber 15.

Housing 25 is provided with an internal circulation chamber 40 within which heating or cooling fluid can be circulated by means of conduits 41, 42. This arrangement allows close control of the cutting temperature during the face-cutting operation. The fluid circulated may be gas or liquid.

During the operation of face-cutting apparatus 10, die plate means 16 is typically oriented such that orifices 17 are aligned with the delivery end of extruder bore 13. As can be seen from FIG. 2A, die plate means 16 comprises an outer die 18 and an inner die 19 each having a set of extrusion orifices 17. Typically during the operation of the face-cutting apparatus 10, the outer die 18 is rotationally fixed to housing 25 using a pin or some other device. Furthermore, inner die 19 is only limitably rotatable with respect to outer die 18. The limits to their relative rotation are provided by a key 20, attached to outer die 18, and protruding into a key way 21 in inner die 19. Thus when outer die 18 is fixedly attached to housing 25, inner die 19 is limitably rotatable with respect to fixed outer die 18 and housing 25.

Attached to inner die 19 is ring gear 36 which meshes with worm gear 35 positioned on the end of the shaft 34 of motor 33. Motor 33 is controlled by a control device 32. Control device 32 receives an input signal from pressure gauge 31 which measures the pressure in chamber 15 through pressure transducer 30. Thus, in response to changes in the pressure in chamber 15, control device 32 activates motor 33 which rotates worm gear 35 thereby causing both ring gear 36 and inner die 19 to rotate with respect to fixed outer die 18.

Assuming that the extrusion orifices 17 are in a relative position of complete alignment, the rotation of inner die 19 with respect to outer die 18 causes extrusion orifices 17 to become misaligned. This misalignment of extrusion orifices 17 effectively reduces the total orifice area through which the heat plastified material is being extruded. Thus by increasingly mismatching orifices 17, the pressure in chamber 15 can be increased. Similarly, the rotation of inner die 19 (with respect to outer die 18) from a position of misalignment of orifices 17 to a position of complete alignment of orifices 17 reduces the pressure in chamber 15.

Using such a system, one can appreciate that it is relatively easy to control the extrusion back pressure in chamber 15.

Referring to FIG. 2A, the orifices 17 in outer die 18 are completely aligned with the orifices 17 in inner die 19. As can be seen, when the orifices 17 are in a position of complete alignment, one side of key 20 abuts against one end of key way 21. Referring now to FIG. 2B, inner die 19 is shown to be in a position of maximum misalignment with outer die 18. In such a position, the other side of key 20 abuts against the other end of key way 21. In the position of maximum misalignment, the orifices 17 are not completely "closed off" from one another. Thus, some flow of heat plastified material is always assured through die plate means 16. This is an important feature of the invention since many prior art devices do not have such a limit device as key 20 and key way 21. While using these prior art devices it was possible to completely "close off" die plate means 16 thereby causing dangerous pressures to become built up in chamber 15 thereby endangering life and property.

Referring again to FIG. 1, orifices 17 are grouped together in an area of the die plate means 16 which is aligned with the delivery end of extruder bore 13. As can be seen, die plate means 16 also has a group of orifices 22 and a group of orifices 23 in different areas of the die plate means. Typically, the orifices 17, 22 and 23 will all have different size diameters. However, it is also possible that the orifices 22 and 23 will have the same size diameters as orifices 17.

As can be readily appreciated, die plate means 16 can have effectively three or four times the number of orifices as those in the prior art devices. This adds both to the life of the machine, as for example when the orifices 17, 22 and 23 all have the same size diameters, and to the versatility of the face-cutting apparatus, for example when orifices 17, 22 and 23 all have different size diameters.

For instance, it may be possible to quadruple the life of the die plate means simply by providing four times the number of extrusion orifices wherein only one group of orifices is able to align with the delivery end of bore 13 at any one time. In order to accomplish this in face-cutting apparatus 10, both inner die 19 and outer die 18 are completely rotatable through 360°. In this way, three or four different die plate areas, each having its own group of extrusion orifices, can be arranged on a die plate means 16 to rotate into a position of alignment with the delivery end of bore 13.

Referring again to FIG. 2A, key 20 and key way 21 provide yet another desirable feature in connection with the free rotatability of both inner die 19 and outer die 18. During the operation of face-cutting apparatus 10, it may be desirable to change quickly from the production of pellets having one size diameter to the production of pellets having another size diameter. In order to do this, it is only necessary to unfasten outer die 18 from housing 25 and then rotate inner die 19. Because inner die 19 and outer die 18 are fixedly connected through key 20 and key way 21 both dies will then rotate. Thus, if material is being extruded through extrusion orifices 17 which are in a position of complete alignment, as shown in FIG. 2A, and it is desired to quickly rotate die plate means 16 so that extrusion orifices 23 will rotate into a position of alignment with the delivery end of bore 13, it is only necessary to rotate inner die 19 in a counterclockwise direction. Because key 20 already abuts with the end of key way 21, outer die 18 (after disengaging it from housing 25) will rotate at the same rotational speed as inner die 19, thereby allowing orifices 23 to be presented to the delivery end of bore 13 with the orifices 23 in a position of complete alignment.

Similarly, as is clearly illustrated in FIG. 2B when the extrusion orifices 17 are in a position of maximum misalignment and it is desired to present a different set of extrusion orifices (orifices 22 for example) to the delivery end of bore 13, it is only necessary to rotate inner die 19 in a clockwise direction in order to bring orifices 22 of die plate means 16 into alignment with the delivery end of bore 13. When orifices 22 are brought into alignment with the delivery end of bore 13, they will be in the same relative position of maximum misalignment as were the extrusion orifices 17 due to the limitably rotatable nature of key 20 within key way 21.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and scope of this invention as defined in the appended claims.

I claim:

1. In a face cutting apparatus having an extrudate feed means with an extrudate delivery end, a die means and a cutter means, an apparatus for controlling extrusion back pressure comprising:
   (a) an upstream die having a plurality of areas, only one of the areas being able to align with the delivery end of said extrudate feed means at any one time, each of said areas having a plurality of extrusion orifices through which an extrudate is adapted to be extruded, the upstream die having a first area with orifices of a different size from the orifices of a second area;
   (b) a downstream die adjacent said upstream die having a plurality of areas each having a plurality of extrusion orifices corresponding to, and being able to exactly align with, the areas and orifices of said upstream die;
   (c) pressure sensing means for sensing the pressure adjacent said extrudate delivery end;
   (d) means for moving one of said dies relative to the other die a distance less than the opening of the largest of said orifices without changing the distance between said dies, in response to a change in the pressure adjacent said extrudate delivery end; and
   (e) means for simultaneously moving both of said dies relative to said extrudate feed means to align another of said areas with said extrudate delivery end without changing the relative positioning of said dies.

2. The face cutting apparatus as described in claim 1, wherein said areas have differing orifice densities.

3. The face cutting apparatus as described in claim 1, wherein means (d) and (e) comprise a keyway in said downstream die and a key fixedly attached to said upstream die and protruding into said keyway.

4. The face cutting apparatus as described in claim 3, wherein the length of said keyway is approximately equal to the opening of the largest of said orifices.

5. The face cutting apparatus as described in claim 4, wherein the orifices in the upstream die exactly align with the orifices in the downstream die when the key abuts one end of the keyway, and the orifices in the upstream die are maximally misaligned with the orifices in the downstream die when the key abuts the opposite end of said keyway.

6. In a face cutting apparatus having an extrudate feed means with an extrudate delivery end, a die means and a cutter means, an apparatus for controlling extrusion back pressure comprising:
   (a) a hollow outer cylindrical die having a plurality of areas, only one of the areas being able to align with the delivery end of said extrudate feed means at any one time, each of said areas having a plurality of extrusion orifices through which an extrudate is adapted to be extruded, the outer cylindrical die having a first area with orifices of a different size from the orifices of a second area;
   (b) a hollow inner cylindrical die adjacent the interior surface of said outer die having a plurality of areas each having a plurality of extrusion orifices corresponding to, and being able to exactly align with, the areas and orifices of said outer die;
   (c) pressure sensing means for sensing the pressure adjacent said extrudate delivery end;
   (d) means for rotating one of said dies relative to the other die through an arcuate range in response to a change in the pressure adjacent said extrudate delivery end; and
   (e) means for simultaneously rotating both of said dies relative to said extrudate feed means to align another of said areas with said extrudate delivery end without changing the relative positioning of said dies.

7. The face cutting apparatus as described in claim 6, wherein means (d) and (e) comprise a keyway in said inner die and a key fixedly attached to said outer die and protruding into said keyway.

8. The face cutting apparatus as described in claim 7, wherein the orifices in the outer die exactly align with the orifices in the inner die when the key abuts one end of the keyway and the orifices in the outer die are maximally misaligned with the orifices in the inner die when the key abuts the opposite end of the keyway.

9. The face cutting apparatus as described in claim 1 or 6, including means for fixedly positioning one of said dies relative to the extrudate feed means.

10. The face cutting apparatus as described in claim 1 or 6, wherein the orifices are circular in shape and the orifices of the first area have different diameters from the orifices of the second area, enabling the apparatus to produce thermoplastic pellets of differing diameters.

* * * * *